United States Patent [19]
Chang

[11] Patent Number: 5,973,477
[45] Date of Patent: Oct. 26, 1999

[54] MULTI-PURPOSE BATTERY MOBILE PHONES

[75] Inventor: Ming-Hsuan Chang, Taipei, Taiwan

[73] Assignee: Creation Intelligence Technology Co., Ltd., Tao-Yuan Hsien, Taiwan

[21] Appl. No.: 09/212,304

[22] Filed: Dec. 16, 1998

[51] Int. Cl.[6] .............................. H02J 7/00; H01G 23/00; H01H 23/00; H01T 23/00
[52] U.S. Cl. ........................... 320/114; 361/232; 429/98; D13/103
[58] Field of Search ..................................... 320/113, 112, 320/114; 361/232; 429/98; D13/103

[56] References Cited

U.S. PATENT DOCUMENTS

| | | | |
|---|---|---|---|
| 4,688,140 | 8/1987 | Hammes | 361/323 |
| 4,872,084 | 10/1989 | Dunning et al. | 361/323 |
| 5,786,106 | 7/1998 | Armani | 429/98 |

*Primary Examiner*—Peter S. Wong
*Assistant Examiner*—Gregory J. Toatley, Jr.
*Attorney, Agent, or Firm*—Rosenberg, Klein & Bilker

[57] ABSTRACT

A multi-purpose battery for mobile phones includes a battery casing and a charging battery unit accommodated in the battery casing. The battery unit has a positive pole connected via a contact "a" of a switching switch to positive poles of a charging contact terminal and a power supply contact terminal. The contact "a" of the switching switch further connects an illuminating element and a press switch to the charging battery unit and negative poles of the charging contact terminal and the power supply contact terminal. The switching switch has another contact "b" connected in series with a buzzer and a high-voltage generator, both of which capable of forming a loop with the charging battery unit when the press switch is pressed. The high-voltage generator is connected to an electric guide rod controllable by a push switch to extend from or retract into the battery casing. All of the above-mentioned components are embedded below an outer planar surface of the battery casing to facilitate operation.

2 Claims, 6 Drawing Sheets

MULTI-PURPOSE BATTERY MOBILE PHONES

BACKGROUND OF THE INVENTION (a) Field of the Invention

The present invention relates generally to a multi-purpose battery for mobile phones, more particularly to a battery that, in addition to having the basic functions of charging and power supplying, has safety and protection functions.

(b) Description of the Prior Art

With their compact size and light weight, mobile phones are very popular today. However, conventional mobile phone batteries are basically used to supply power to the mobile phone.

FIG. 1 shows the structure of a conventional mobile phone battery B. FIG. 2 is a circuit diagram of the battery B. As shown, a battery casing 1 is provided with a charging contact terminal 11 at an end surface. A power supply contact terminal 12 (not shown in FIG. 1) is oppositely provided at a bottom edge of the charging contact terminal 11. After the battery B has been charged and mounted at a backside of a handset A, a battery unit 2 will supply power to the handset A via the power supply contact terminal 12.

It is a waste of electric power if the battery B can only supply power to the handset A. It is desirable to have a mobile phone battery that, in addition to supplying power to the mobile phone and being rechargeable, has additional functions.

SUMMARY OF THE INVENTION

Therefore, a primary object of the present invention is to provide a multi-purpose battery for mobile phones which, in addition to having the basic functions of charging and power supplying, can be used as a lighting device and a self-defense device.

According to the present invention, a multi-purpose battery for mobile phones comprises a battery casing and a charging battery unit accommodated in the battery casing. The battery unit has a positive pole connected via a contact "a" of a switching switch to positive poles of a charging contact terminal and a power supply contact terminal. The contact "a" of the switching switch further connects an illuminating element and a press switch to the charging battery unit and negative poles of the charging contact terminal and the power supply contact terminal. The switching switch has another contact "b" connected in series with a buzzer and a high-voltage generator, both of which capable of forming a loop with the charging battery unit when the press switch is pressed. The high-voltage generator is connected to an electric guide rod controllable by a push switch to extend from or retract into the battery casing. All of the above-mentioned components are embedded below an outer planar surface of the battery casing to facilitate operation.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
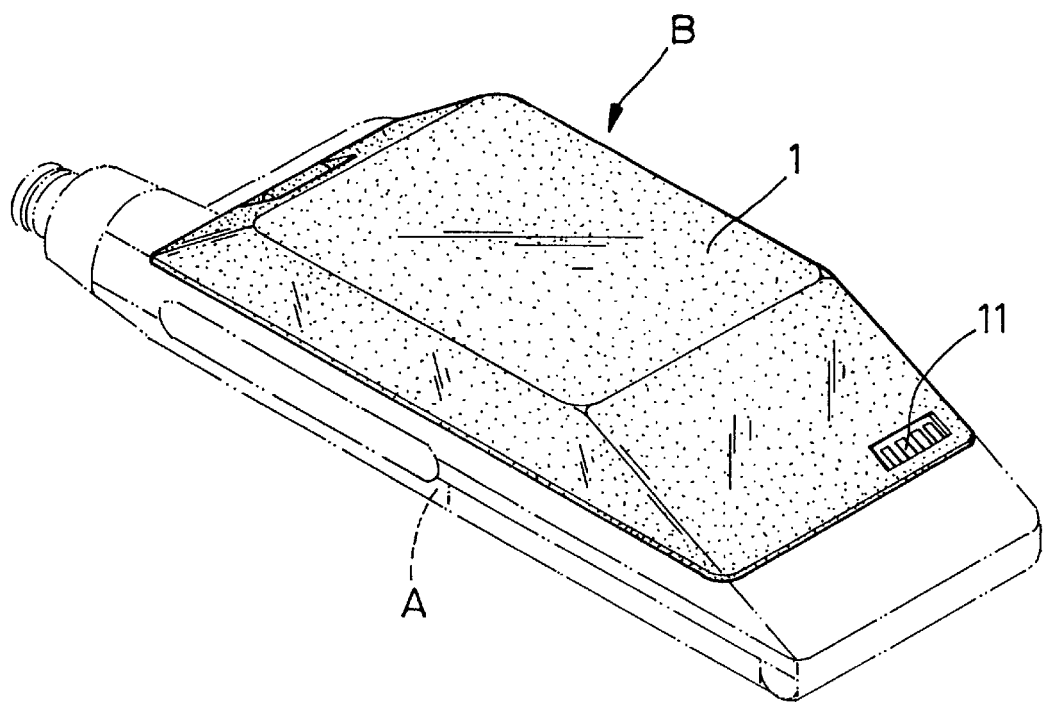
FIG. 1 is a schematic perspective view of a conventional mobile phone battery.
Figure 2:
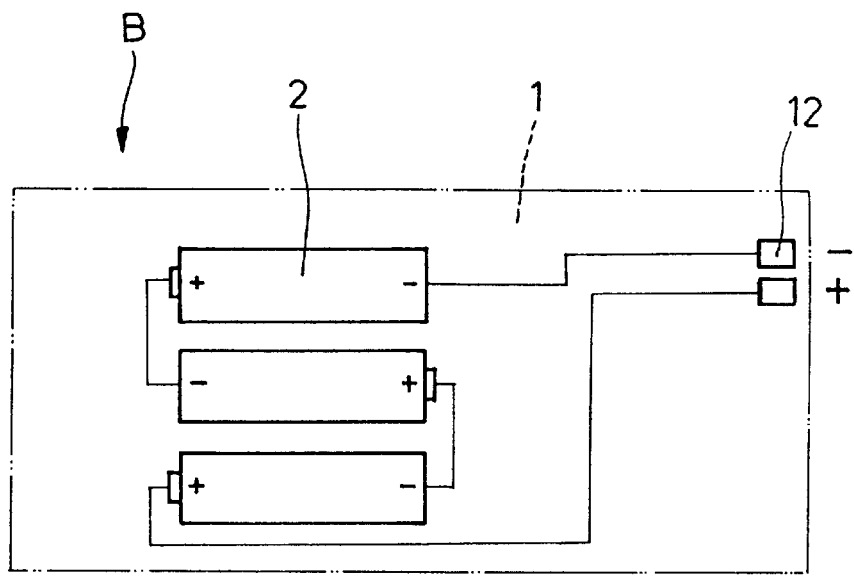
FIG. 2 is a circuit diagram of the conventional mobile phone battery in FIG. 1.
Figure 3:
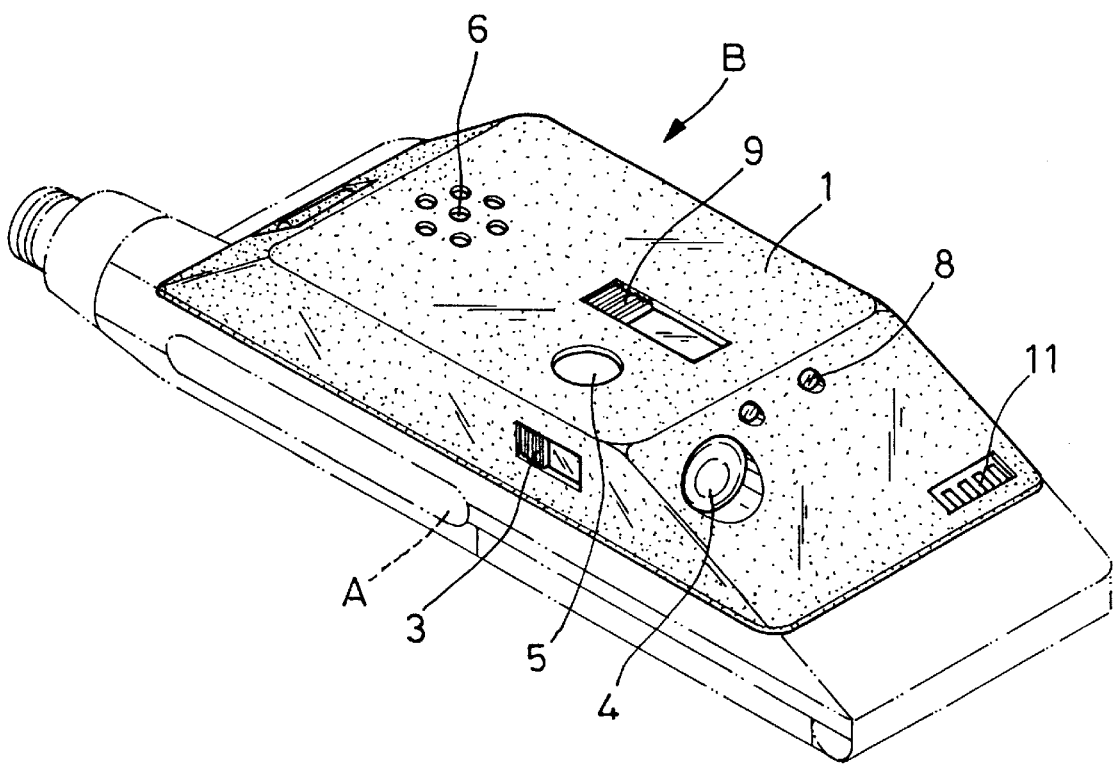
FIG. 3 is a perspective view of a multi-purpose mobile phone battery according to the present invention, showing the battery in a state of normal use.

With reference to FIGS. 3–6, the present invention essentially comprises a battery casing 1 and a charging battery unit 2 disposed therein. The latter has a positive pole connected via a contact 31 of a switching switch 3 at "a" to positive poles of a charging contact terminal 11 and a power supply contact terminal 12. The contact 31 of the switching switch 3 at "a" further connects an illuminating element 4 and a press switch 5 to the charging battery unit 2 and negative poles of the charging and power supply contact terminals 11, 12. Another contact 32 of the switching switch 3 at "b" is connected in series with a buzzer 6 and a high-voltage generator 7 and forms a loop with the charging battery unit 2 by means of the press switch 2. The high-voltage generator 7 is connected to an electric guide rod 8 which can be controlled to extend from or retract into the battery casing 1 by use of a push switch 9. All of the above-described components are embedded below an outer planar surface of the battery casing 1 and are easy to operate.

Apart from providing the basic functions of charging and power supplying, the present invention further ensures safety and protection.

In the present invention, since the switching switch 3, the illuminating element 4, the press switch 5 and the push switch 9 are all disposed below the planar surface of the battery casing 1 and do not project therefrom, and since the electric guide rod 8 is also concealable within the battery casing 1, the basic charging and power supplying functions of a battery B will not be affected.

Figure 5:
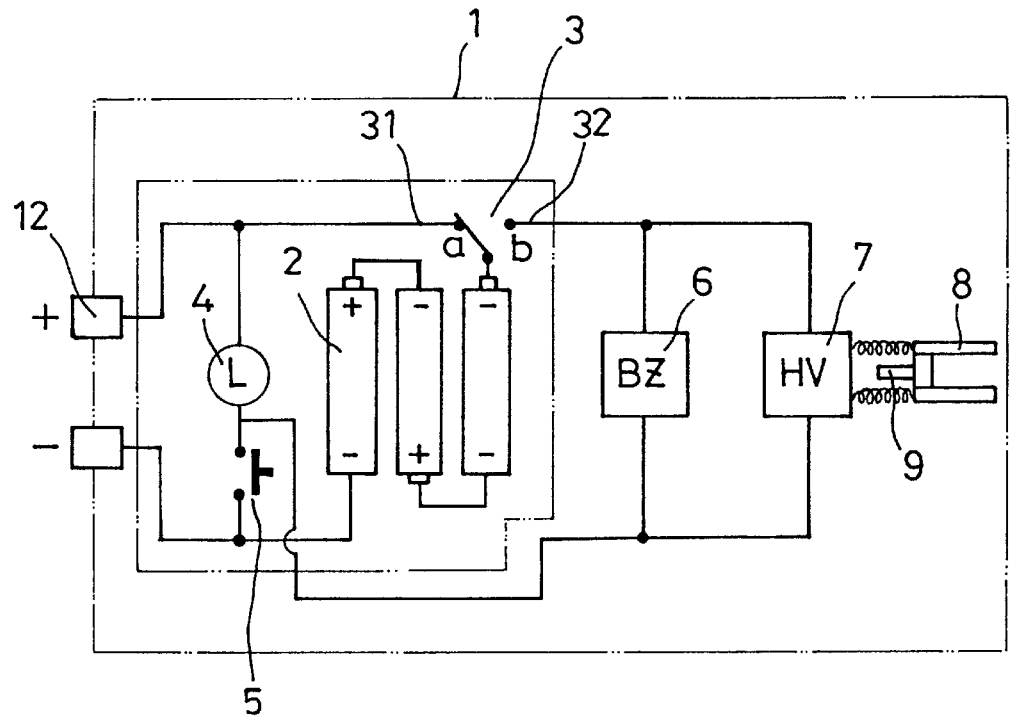
FIG. 5 is a circuit diagram according to the present invention, showing a state of normal use.
Figure 6:
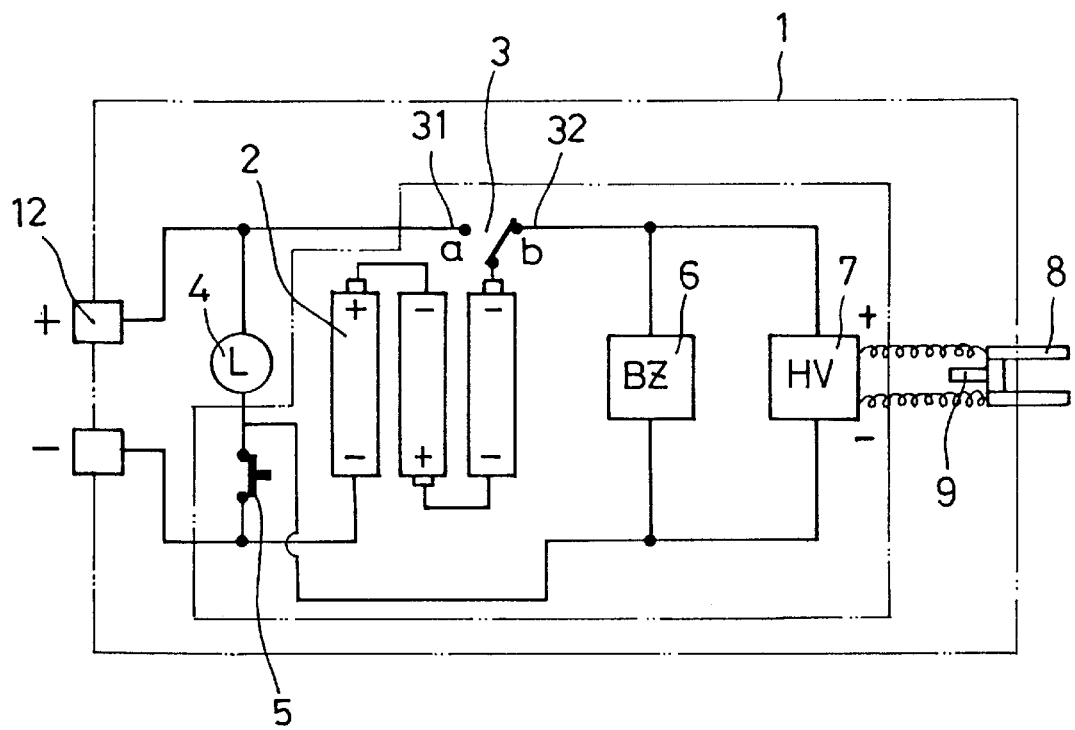
FIG. 6 is a circuit diagram according to the present invention, showing a state of special use.
Figure 7:
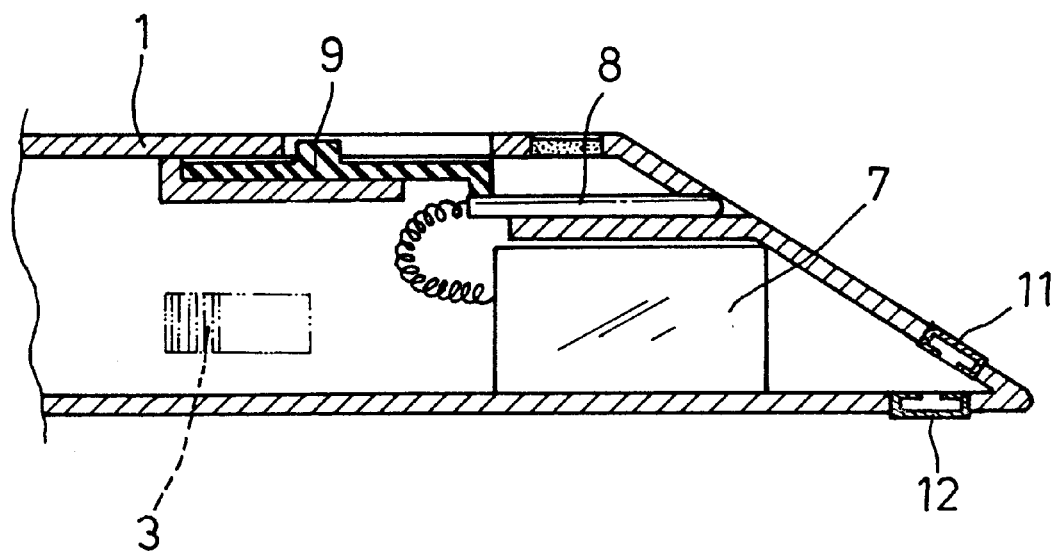
FIG. 7 is a sectional view showing a state of use of the present invention.

With reference to FIGS. 5–7, in which the switching switch 3 is positioned at contact 31 at "a" and the electric guide rod 8 is concealed in the battery casing 1 by the push switch 9, the loop formed by the charging battery unit 2 and the charging and power supply contact terminals 11, 12 can provide the basic functions of charging and power supplying. When the press switch 5 is pressed and it is "on," the present invention can be used for lighting purposes, while the battery B can still supply power to a handset A as usual.

Figure 4:
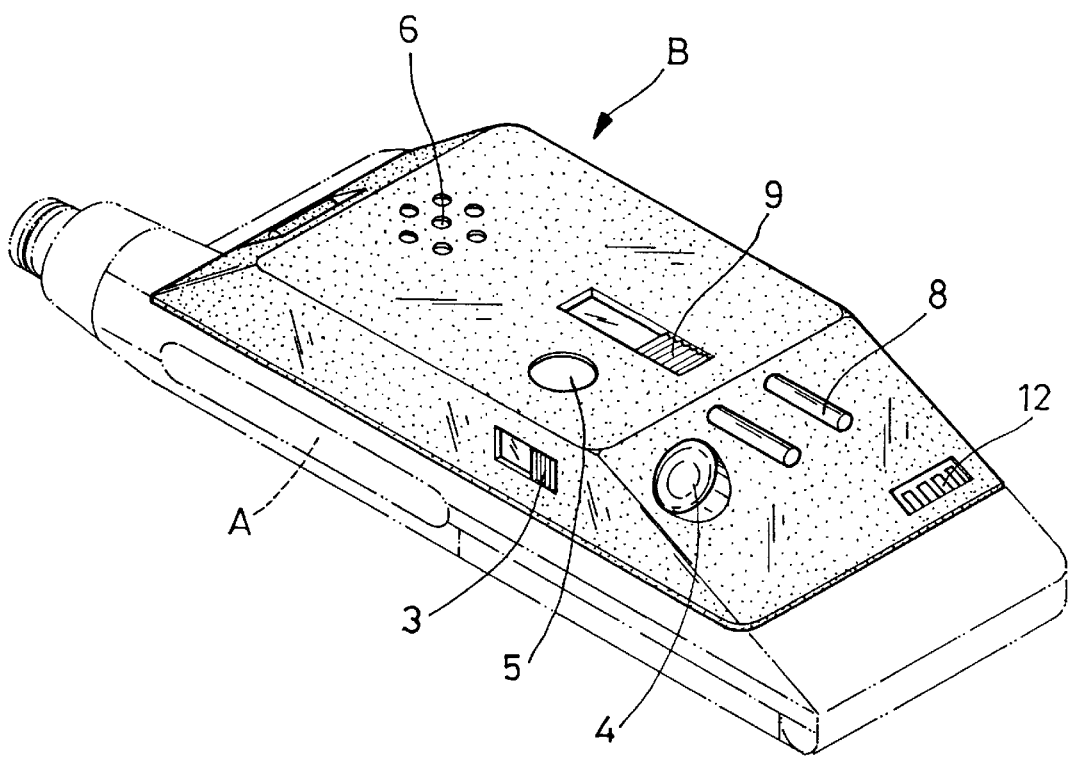
FIG. 4 is a perspective view of the battery according to the present invention, showing it in a state of special use.
Figure 8:
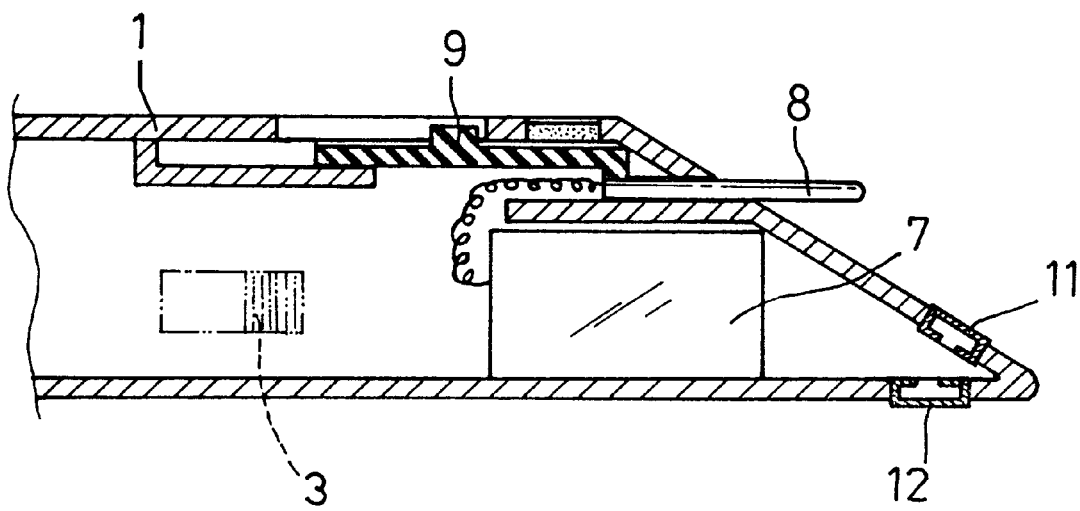
FIG. 8 is a sectional view showing another state of use of the present invention.

Furthermore, referring to FIGS. 4, 6 and 8, in case of assault, the user may push the switching switch to the contact 32 at "b" so that the buzzer 6 and the high-voltage generator 7 are connected to the charging battery unit 2 at the pressing of the press switch 5, emitting warning sounds and producing high voltages. The user may then press the push switch 9 to extend the electric guide rod 8 from the battery casing 1 to strike the assailant.

Figure 9:
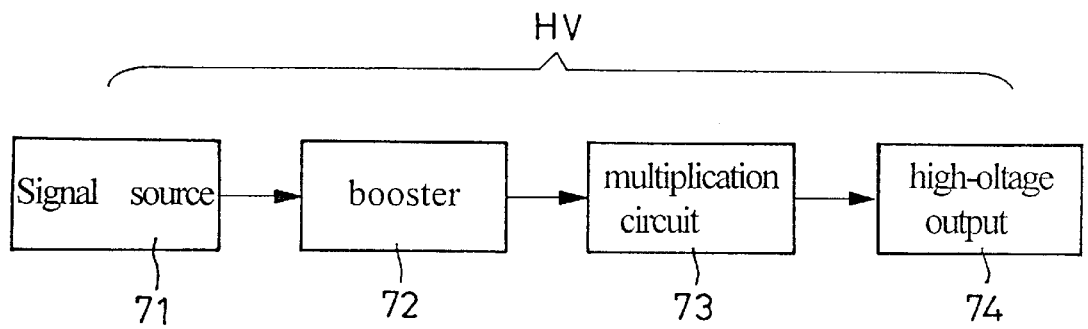
FIG. 9 is a block diagram of a high voltage generator adopted in the present invention.
Figure 10:
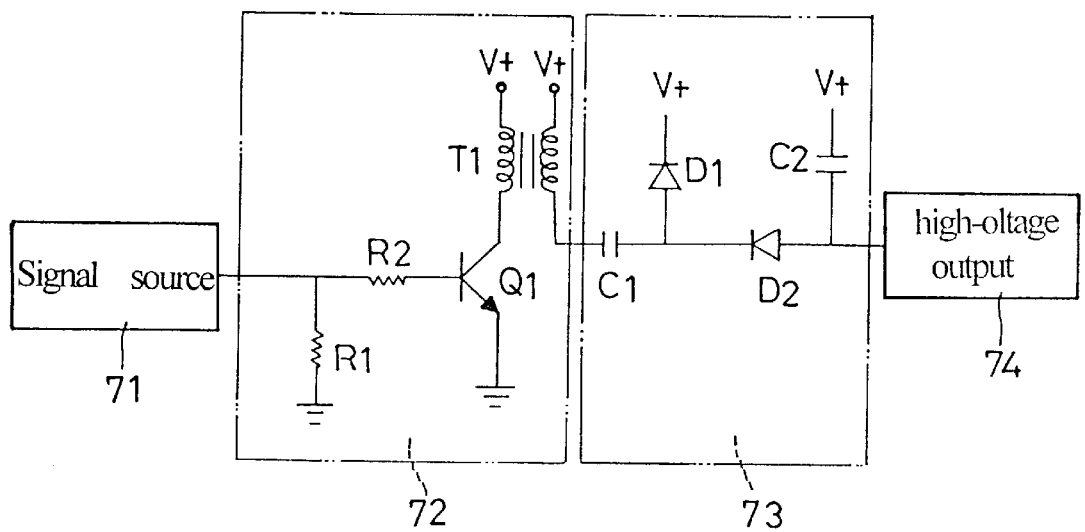
FIG. 10 is a circuit diagram of the high voltage generator of the present invention.

Referring to FIGS. 9 and 10, the above-mentioned high-voltage generator 7 is comprised of a booster 72 and a multiplication circuit 73. Since the charging battery unit 2 supplies direct currents which are insufficient for striking purposes, waves and voltage signals provided by a signal source 71 thereof are converted via the booster 72 to high-voltage alternating currents while the basic waves remain unchanged. The voltages are further boosted to a high-voltage output 74 of over 1300 volts using the multiplication circuit 73 and discharged via the electric guide rod 8.

It can therefore appreciated from the foregoing that the present invention, in addition to having the basic functions of power recharging and supplying, can be used not only as a lighting device but also as an alarm and an electric rod for self-defense in case of emergencies. Furthermore, since the electric rod is not operable unless the above-mentioned steps—the switching switch 3 is switched to contact 32 at "b"; the press switch 5 is pressed; and the press switch 9 is pushed to cause the electric guide rod 8 to extend from the battery casing 1—are performed, accidents caused by inadvertence are avoided. Safety is therefore ensured.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-purpose battery for mobile phones, comprising a battery casing and a charging battery unit accommodated in said battery casing, said battery unit having a positive pole connected via a contact "a" of a switching switch to positive poles of a charging contact terminal and a power supply contact terminal, said contact "a" of said switching switch further connecting an illuminating element and a press switch to said charging battery unit and negative poles of said charging contact terminal and said power supply contact terminal, said switching switch having another contact "b" connected in series with a buzzer and a high-voltage generator, both of which capable of forming a loop with said charging battery unit when said press switch is pressed, said high-voltage generator being connected to an electric guide rod controllable by a push switch to extend from or retract into said battery casing, all said components being embedded below an outer planar surface of said battery casing to facilitate operation.

2. A multi-purpose battery for mobile phones as defined in claim 1, wherein said high-voltage generator is comprised of a booster and a multiplication circuit.

\* \* \* \* \*